United States Patent
Jang et al.

(10) Patent No.: US 12,322,790 B2
(45) Date of Patent: *Jun. 3, 2025

(54) ANODE FOR LITHIUM SECONDARY BATTERY AND LITHIUM SECONDARY BATTERY INCLUDING THE SAME

(71) Applicant: SK ON CO., LTD., Seoul (KR)

(72) Inventors: Hwan Ho Jang, Daejeon (KR); Moon Sung Kim, Daejeon (KR); Hyo Mi Kim, Daejeon (KR); Sang Baek Ryu, Daejeon (KR); Da Hye Park, Daejeon (KR); Seung Hyun Yook, Daejeon (KR); Da Bin Chung, Daejeon (KR); Jun Hee Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,034

(22) Filed: Oct. 17, 2023

(65) Prior Publication Data
US 2024/0047651 A1 Feb. 8, 2024

Related U.S. Application Data

(63) Continuation of application No. 18/329,905, filed on Jun. 6, 2023, now Pat. No. 11,929,491.

(30) Foreign Application Priority Data

Jul. 25, 2022 (KR) .................. 10-2022-0091594

(51) Int. Cl.
| | | |
|---|---|---|
| *H01M 4/36* | (2006.01) |
| *H01M 4/02* | (2006.01) |
| *H01M 4/133* | (2010.01) |
| *H01M 4/134* | (2010.01) |
| *H01M 4/38* | (2006.01) |
| *H01M 4/587* | (2010.01) |
| *H01M 4/62* | (2006.01) |

(52) U.S. Cl.
CPC .......... *H01M 4/364* (2013.01); *H01M 4/133* (2013.01); *H01M 4/134* (2013.01); *H01M 4/386* (2013.01); *H01M 4/587* (2013.01); *H01M 4/622* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 11,929,491 B2 * | 3/2024 | Jang | ...................... | H01M 4/622 |
| 11,929,495 B2 * | 3/2024 | Kim | ...................... | H01M 4/58 |
| 2003/0118905 A1 * | 6/2003 | Fukuoka | .................. | H01M 4/38 |
| | | | | 429/232 |
| 2005/0186475 A1 | 8/2005 | Jeong et al. | | |
| 2020/0243853 A1 | 7/2020 | Lee et al. | | |
| 2022/0140327 A1 * | 5/2022 | Lee | ........................ | H01M 4/366 |
| | | | | 429/218.1 |
| 2022/0359864 A1 * | 11/2022 | Lee | ........................ | H01M 4/625 |
| 2022/0393151 A1 * | 12/2022 | Matsubara | ............ | H01M 4/587 |
| 2022/0407053 A1 * | 12/2022 | Jang | ........................ | H01M 4/134 |
| 2023/0163277 A1 * | 5/2023 | Jeong | ..................... | H01M 4/483 |
| | | | | 429/217 |
| 2023/0163283 A1 | 5/2023 | Jeong et al. | | |
| 2023/0253546 A1 * | 8/2023 | Jeon | ........................ | H01M 4/133 |
| | | | | 429/231.8 |
| 2023/0395800 A1 * | 12/2023 | Park | ................... | H01M 10/0525 |
| 2024/0063373 A1 * | 2/2024 | Kim | ........................ | H01M 4/366 |
| 2024/0079563 A1 * | 3/2024 | Lee | ........................ | H01M 4/133 |

FOREIGN PATENT DOCUMENTS

| | | | | |
|---|---|---|---|---|
| CN | 1661833 A | | 8/2005 | |
| EP | 3675252 A1 | | 7/2020 | |
| EP | 3872896 A1 | | 9/2021 | |
| KR | 10-2016-0087121 | * | 7/2016 | |
| WO | WO-2021133128 A1 | * | 7/2021 | ........ H01M 10/0525 |
| WO | 2023096443 A1 | | 6/2023 | |

OTHER PUBLICATIONS

Machine translation of KR 10-2016-0087121, published on Jul. 21, 2016 (Year: 2016).*
Extended European Search Report for the European Patent Application No. 23179439.7 issued by the European Patent Office on Jan. 26, 2024.
Office Action for the Chinese Patent Application No. 202310803399.6 issued by the Chinese Patent Office on Nov. 30, 2023.

* cited by examiner

*Primary Examiner* — Anca Eoff
(74) *Attorney, Agent, or Firm* — IP & T GROUP LLP

(57) ABSTRACT

An anode for a lithium secondary battery includes an anode current collector, and an anode active material layer formed on at least one surface of the anode current collector. The anode active material layer includes a carbon-based active material, a first silicon-based active material doped with magnesium and a second silicon-based active material not doped with magnesium. A content of the first silicon-based active material is in a range from 2 wt % to 20 wt % based on a total weight of the anode active material layer.

14 Claims, 2 Drawing Sheets

ANODE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application is a continuation of U.S. patent application Ser. No. 18/329,905 filed on Jun. 6, 2023, which claims priority to Korean Patent Application No. 10-2022-0091594 filed on Jul. 25, 2022 in the Korean Intellectual Property Office (KIPO), the entire disclosure of which is incorporated by reference herein.

BACKGROUND

1. Field

The disclosures of this patent application relate to an anode for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as an electric automobile, a hybrid vehicle, etc.

Examples of the secondary battery include a lithium secondary battery, a nickel-cadmium battery, a nickel-hydrogen battery, etc. The lithium secondary battery is often applied due to its high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape accommodating the electrode assembly and the electrolyte.

Recently, as the range of applications for lithium secondary batteries has expanded, lithium secondary batteries having higher capacity and power have been developed. Particularly, silicon (having a relatively higher capacity) and carbon have been used together as an anode active material in lithium secondary batteries.

SUMMARY

According to one aspect of the present disclosure, there is provided an anode for a lithium secondary battery having improved capacity and life-span properties.

According to another aspect of the present disclosure, there is provided a lithium secondary battery having improved capacity and life-span properties.

In one embodiment, an anode for a lithium secondary battery includes an anode current collector, and an anode active material layer formed on at least one surface of the anode current collector. The anode active material layer includes a carbon-based active material, a first silicon-based active material doped with magnesium and a second silicon-based active material not doped with magnesium. A content of the first silicon-based active material is in a range from 2 wt % to 20 wt % based on a total weight of the anode active material layer.

In some embodiments, the anode active material layer may include a first anode active material layer formed directly on the at least one surface of the anode current collector, and a second anode active material layer formed on the first anode active material layer.

In other embodiments, the first anode active material layer may include the first silicon-based active material, and the second anode active material layer may include the second silicon-based active material not doped with magnesium.

In still other embodiments, the first anode active material layer may further include the second silicon-based active material not doped with magnesium, and the second anode active material layer may further include the first silicon-based active material. A content of the first silicon-based active material included in the first anode active material layer may be greater than or equal to a content of the second silicon-based active material included in the first anode active material layer. A content of the first silicon-based active material included in the second anode active material layer may be less than or equal to a content of the second silicon-based active material included in the second anode active material layer.

In some embodiments, the first anode active material layer may include the second silicon-based active material not doped with magnesium, and the second anode active material layer may include the first silicon-based active material.

In other embodiments, the first anode active material layer may further include the first silicon-based active material, and the second anode active material layer may further include the second silicon-based active material not doped with magnesium. A content of the first silicon-based active material included in the first anode active material layer may be less than or equal to a content of the second silicon-based active material included in the first anode active material layer. A content of the first silicon-based active material included in the second anode active material layer may be greater than or equal to a content of the second silicon-based active material included in the second anode active material layer.

In still other embodiments, a sum of contents of the first silicon-based active material and the second silicon-based active material not doped with magnesium may be in a range from 0.1 wt % to 40 wt % based on the total weight of the anode active material layer.

In some embodiments, the carbon-based active material may include artificial graphite.

In other embodiments, the carbon-based active material may further include natural graphite. A content of natural graphite included in the anode active material layer may be less than or equal to a content of artificial graphite included in the anode active material layer.

In still other embodiments, the second silicon-based active material not doped with magnesium may be doped with at least one metal selected from the group consisting of Li, Al, Ca, Fe, Ti and V.

In some embodiments, at least one of the first silicon-based active material and the second silicon-based active material not doped with magnesium may include a carbon coating layer disposed on an outermost portion thereof.

In other embodiments, a content of magnesium doped in the first silicon-based active material may be in a range from 5 wt % to 17 wt % based on a total weight of the first silicon-based active material.

In still other embodiments, a Mg1s spectrum of a surface of the first silicon-based active material measured by an X-ray photoelectron spectroscopy may satisfy Formula 1.

$$P_{Mg}/(P_{Mg}+P_{MgO}) \leq 0.6 \quad \text{[Formula 1]}$$

In Formula 1, P Mg is an area of a 1303 eV peak of the Mg1s spectrum, and $P_{MgO}$ is an area of a 1304.5 eV peak of the Mg1s spectrum.

In some embodiments, a primer layer may be further included between the anode current collector and the anode active material layer. The primer layer includes an anode binder.

In other embodiments, the anode binder may include at least one selected from the group consisting of styrene-butadiene rubber (SBR), carboxymethyl cellulose (CMC), polyacrylic acid (PAA) and polyvinyl alcohol (PVA).

In still other embodiments, the primer layer may further include at least one selected from the group consisting of the carbon-based active material, the first silicon-based active material, and the second silicon-based active material.

In one embodiment, there is provided a lithium secondary battery which includes the anode for a lithium secondary battery according to the above-described embodiments, and a cathode facing the anode.

In another embodiment, there is provided an anode for a secondary lithium battery which includes an anode active material layer including a first silicon-based active material doped with magnesium and a carbon-based active material. In one example, the first silicon-based active material doped with magnesium may include micropores. Accordingly, swelling of the first silicon-based active material may be reduced during charging and discharging. Thus, rapid charge life-span properties and cycle properties at room temperature of the lithium secondary battery may be improved while suppressing cracks of the silicon-based active material during charging and discharging.

In further embodiments, the anode active material layer may have a double-layered structure of a first anode active material layer and a second anode active material layer. A content ratio of the first silicon-based active material in the first anode active material layer and in the second anode active material layer may be adjusted so that rapid charge life-span and high-temperature life-span properties may be further improved.

DETAILED DESCRIPTION OF THE EMBODIMENTS

According to various embodiments of the present disclosure, an anode for a lithium secondary battery including a silicon-based active material is provided. According to other embodiments of the present disclosure, a lithium secondary battery including the anode for a lithium secondary battery is also provided.

Hereinafter, the present invention will be described in detail with reference to the disclosed embodiments and the accompanying drawings. However, those skilled in the art will appreciate that such embodiments described with reference to the accompanying drawings are provided in order to understand the present invention and do not limit the present disclosure.

As noted above, silicon (having a relatively higher capacity) and carbon have been used together as an anode active material in lithium secondary batteries. However, a large difference of volume expansion ratios generated between silicon and carbon can cause cracks in the anode leading to electrolyte exposure, especially after repeated charging and discharging of the batteries.

Figure 1:
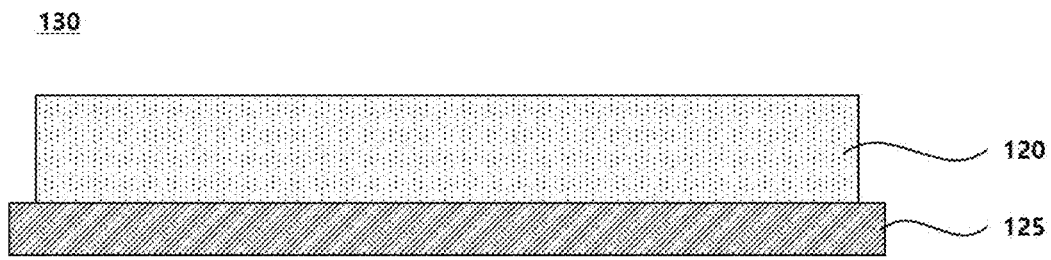
FIG. 1 is a schematic cross-sectional view illustrating an anode for a lithium secondary battery in accordance with various embodiments.

FIG. 1 is a schematic cross-sectional view illustrating an anode for a lithium secondary battery in accordance with embodiments of the present disclosure.

Referring to FIG. 1, an anode 130 includes an anode current collector 125 and an anode active material layer 120 formed on the anode current collector 125.

In one example, the anode current collector 125 may include a metal a) having a high conductivity, b) exhibiting improved adhesion to an anode slurry, and c) not being reactive within a voltage range of a secondary battery. For example, the anode current collector 125 may include copper, stainless steel, nickel, titanium, or an alloy thereof. The anode current collector 125 may include copper or stainless steel that may be surface-treated with carbon, nickel, titanium or silver.

In some embodiments of the present disclosure, the anode active material layer 120 including a silicon-based active material and a carbon-based active material may be formed on at least one surface of the anode current collector 125.

In other embodiments of the present disclosure, the silicon-based active material may include a first silicon-based active material doped with magnesium (Mg) and a second silicon-based active material not doped with magnesium.

The first silicon-based active material doped with magnesium may include micropores. Accordingly, swelling of the first silicon-based active material may be reduced during charging and discharging. Thus, cracks of the silicon-based active material may be suppressed during charging and discharging so that rapid-charge, life-span, and cycle properties at room temperature of the lithium secondary battery may be improved.

In one example, the first silicon-based active material may be formed by mixing, heating, cooling and pulverizing a silicon-based active material and a magnesium source.

In one embodiment, the silicon-based active material may be a mixture of silicon and silicon dioxide ($SiO_2$). In this case, a ratio of the number of moles of $SiO_2$ to the number of moles of silicon may be in a range from 0.5 to 1.5.

In one example, the magnesium source may be a solid-phase magnesium.

The silicon-based active material and the magnesium source may be formed into a mixture.

In one embodiment, a content of the magnesium source may be in a range from 5 weight percent (wt %) to 17 wt % based on a total weight of the mixture. Within this range, deterioration of capacity properties of the secondary battery due to an excessive reduction of the silicon content may be prevented while doping a sufficient amount of magnesium into the silicon-based active material.

In one example, the mixture may be calcined at temperatures ranging from 1000° C. to 1800° C., and then cooled to precipitate a silicon oxide composite containing magnesium. The silicon oxide composite containing magnesium may be pulverized and classified to obtain the first silicon-based active material.

In further embodiments of the present disclosure, a content of the first silicon-based active material may be in a range from 2 wt % to 20 wt % based on a total weight of the anode active material layer 120. In one embodiment, the content of the first silicon-based active material may be in a range from 3 wt % to 17 wt %. Within these ranges, deterioration of high-temperature life-span properties may be suppressed while improving the rapid charge properties and the life-span properties at room temperature of the battery.

In some embodiments of the present disclosure, each of the first silicon-based active material and the second silicon-based active material may include silicon-based active material particles.

In one example, the silicon-based active material particles may include at least one selected from the group consisting of Si, SiOx (0<x<2), a Si-Q alloy (Q is at least one element selected from the group consisting of an alkali metal, an alkaline earth metal, a group 13 element, a group 14 element, a group 15 element, a group 16 element, a transition metal, a rare earth element and a combination thereof, but not Si), and a Si-carbon composite.

In another example, the silicon-based active material particle may include a mixture of at least one selected from the above-mentioned group and $SiO_2$. In one embodiment, the silicon-based active material particles may include SiOx (0<x<2).

In some embodiments of the present disclosure, each of the first silicon-based active material and the second silicon-based active material may further include a carbon coating layer formed on a surface portion of the silicon-based active material particle. Accordingly, contact of the silicon-based active material particles with moisture in air and/or water in an anode slurry may be prevented. Thus, reduction of a discharge capacity of a lithium secondary battery may be prevented.

In one example, the carbon coating layer may include at least one selected from the group consisting of amorphous carbon, carbon nanotube, carbon nanofiber, graphite, graphene, graphene oxide and reduced graphene oxide.

In another example, the carbon coating layer may be disposed on an outermost portion of at least one of the first silicon-based active material and the second silicon-based active material.

In other embodiments of the present disclosure, a content of magnesium doped in the first silicon-based active material may be in a range from 5 wt % to 17 wt % based on a total weight of the first silicon-based active material. Within this range, high-capacity properties from silicon may be maintained while the rapid-charge properties and the life-span properties at room temperature may be improved from the magnesium doping.

In further embodiments of the present disclosure, a content of magnesium hydroxide (e.g., $Mg(OH)_2$) remaining on the surface of the first silicon-based active material may be less than 0.05 wt % based on the total weight of the first silicon-based active material. Within this range, a sufficient amount of magnesium may be doped into the first silicon-based active material, and side reactions on the surface of the first silicon-based active material may be suppressed.

In some embodiments of the present disclosure, a Mg1s spectrum of the surface of the first silicon-based active material measured by an X-ray photoelectron spectroscopy (XPS) may satisfy Formula 1 below.

$$P_{Mg}/(P_{Mg}+P_{MgO}) \leq 0.6 \quad \text{[Formula 1]}$$

In Formula 1, P Mg is an area of a 1303 eV peak in the Mg1s spectrum, and $P_{MgO}$ is an area of a 1304.5 eV peak in the Mg1s spectrum.

$P_{Mg}$ is an area of a peak at 1303 eV representing a magnesium element. $P_{MgO}$ is an area of a peak at 1304.5 eV representing a combination of the magnesium element and the oxygen element.

$P_{Mg}/(P_{Mg}+P_{MgO})$ value in Formula 1 may indicate a ratio of a magnesium metal among the magnesium metal, magnesium oxide and magnesium hydroxide present on the surface of the first silicon-based active material.

When the first silicon-based active material satisfies Formula 1, magnesium remaining on the surface of the first silicon-based active material may be prevented from being converted into magnesium hydroxide to cause side reactions. Accordingly, the life-span properties of the lithium secondary battery may be improved.

In other embodiments of the present disclosure, a sum of a) the content of the first silicon-based active material and b) the content of the second silicon-based active material may be in a range from 0.1 wt % to 40 wt %, and, in one embodiment, may range from 6 wt % to 25 wt % based on the total weight of the anode active material layer 120. Within these ranges, a rapid increase in a ratio of a volume expansion to an energy density of the lithium secondary battery may be prevented. Accordingly, the life-span properties of the lithium secondary battery may be improved during repeated rapid charging and discharging.

In some embodiments of the present disclosure, the second silicon-based active material that is not doped with magnesium may be doped with a metal other than magnesium.

In one example, the second silicon-based active material may be doped with at least one metal or more selected from the group consisting of Li, Al, Ca, Fe, Ti and V. Accordingly, conductivity and/or structural stability of the second silicon-based active material may be improved.

In further embodiments of the present disclosure, the carbon-based active material may include both artificial graphite and natural graphite.

In one example, when only natural graphite is used as an anode active material, adhesion to the anode current collector may be enhanced, but resistance may be increased during the rapid charging and discharging, resulting in degraded power properties. Further, natural graphite may be damaged due to an expansion of the silicon-based active material, and the mobility of lithium ions may be reduced. Accordingly, side reactions may occur in the anode and the life-span properties may be deteriorated.

In various embodiments of the present disclosure, the carbon-based active material included in the anode active material layer 120 may include artificial graphite and/or natural graphite. Accordingly, the adhesive strength between the anode current collector 125 and the anode active material layer 120 (and power properties of the lithium secondary battery) may be improved.

In some embodiments of the present disclosure, an amount of natural graphite included in the anode active material layer 120 may be less than or equal to an amount of artificial graphite included in the anode active material layer 120. Accordingly, the life-span properties and durability of the secondary battery may be improved.

In one embodiment, the carbon-based active material may include artificial graphite, or a mixture of artificial graphite and natural graphite.

In one example, an anode active material composition including the anode active material including the carbon-based active material, the first silicon-based active material and the second silicon-based active material may be coated on the anode current collector 125, and then dried and pressed to form the anode active material layer 120.

The anode active material may include a plurality of the carbon-based active material particles, a plurality of the first silicon-based active material particles, and a plurality of the second silicon-based active material particles. In one example, a total amount of the carbon-based active material particles, the first silicon-based active material particles and the second silicon-based active material particles may be 50 wt % or more based on the total weight of the anode active material.

In other embodiments of the present disclosure, the total amount of the carbon-based active material particles, the first silicon-based active material particles and the second silicon-based active material particles may be 60 wt % or more, 70 wt % or more, 80 wt % or more, or 90 wt % or more based on the total weight of the anode active material. In one embodiment, the anode active material may substantially consist of the carbon-based active material particles, the first silicon-based active material particles and the second silicon-based active material particles.

In one example, the anode active material composition may be prepared by mixing the carbon-based active material, the first silicon-based active material, and a second silicon-based active material in a solvent with an anode binder, a conductive material, a thickener and/or a dispersive agent.

The solvent may include an aqueous solvent such as water, an aqueous hydrochloric acid solution or an aqueous sodium hydroxide solution, or a non-aqueous solvent such as N-methyl-2-pyrrolidone (NMP), dimethylformamide, dimethylacetamide, N,N-dimethylaminopropylamine, ethylene oxide, tetrahydrofuran, etc.

In one example, a polymer material such as styrene-butadiene rubber (SBR) may be used as the anode binder. Carboxymethyl cellulose (CMC) may be used as the thickener.

The conductive material may be included to promote an electron mobility between active material particles. For example, the conductive material may include a carbon-based conductive material such as graphite, carbon black, graphene, carbon nanotube, etc., and/or a metal-based conductive material such as tin, tin oxide, titanium oxide, a perovskite material such as $LaSrCoO_3$, $LaSrMnO_3$, etc.

According to various embodiments of the present disclosures, both the silicon-based active material and the carbon-based active material are used so that the life-span properties may be improved while utilizing high-capacity properties of silicon.

Figure 2:
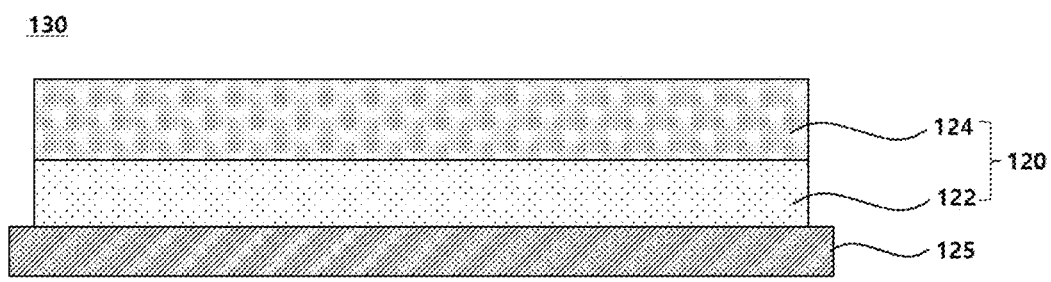
FIG. 2 is a schematic cross-sectional view illustrating an anode for a lithium secondary battery in accordance with other embodiments.

FIG. 2 is a schematic cross-sectional view illustrating an anode for a lithium secondary battery in accordance with various embodiments of the present disclosure.

Referring to FIG. 2, the anode active material layer 120 may include a first anode active material layer 122 directly formed on at least one surface of the anode current collector 125 and a second anode active material layer 124 formed on the first anode active material layer 122. In one example, the anode active material layer 120 may include a double-layered structure in which the first anode active material layer 122 and the second anode active material layer 124 are sequentially disposed on the anode current collector 125.

The second anode active material layer 124 may be disposed, e.g., at an outermost portion of the anode 130.

In one example, when the first silicon-based active material doped with magnesium is used, rapid charge life-span properties and room-temperature life-span properties may be improved, but high-temperature life-span properties may be relatively deteriorated due to an irreversible side reaction.

According to various embodiments of the present disclosure, the first anode active material layer 122 and the second anode active material layer 124 may have different active material compositions.

In some embodiments of the present disclosure, the first anode active material layer 122 may include the first silicon-based active material, and the second anode active material layer 124 may include the second silicon-based active material.

In one embodiment, the first anode active material layer 122 may further include the second silicon-based active material. In this case, a content of the first silicon-based active material included in the first anode active material layer 122 may be greater than or equal to a content of the second silicon-based active material included in the first anode active material layer 122.

In one embodiment, the second anode active material layer 124 may further include the first silicon-based active material. In this case, a content of the first silicon-based active material included in the second anode active material layer 124 may be less than or equal to a content of the second silicon-based active material included in the second anode active material layer 124.

Thus, a relatively small amount of the first silicon-based active material doped with magnesium may be included in the second anode active material layer 124 that may react with an outside at the outermost portion. Accordingly, the high-temperature life-span properties of the lithium secondary battery may be improved.

In one embodiment, the second silicon-based active material may not be included in the first anode active material layer 122, and the first silicon-based active material may not be included in the second anode active material layer 124.

In some embodiments, the first anode active material layer 122 may include the second silicon-based active material, and the second anode active material layer 124 may include the first silicon-based active material.

In one embodiment, the first anode active material layer 122 may further include the first silicon-based active material. In this case, a content of the first silicon-based active material included in the first anode active material layer 122 may be less than or equal to a content of the second silicon-based active material included in the first anode active material layer 122.

In one embodiment, the second anode active material layer 124 may further include the second silicon-based active material. In this case, a content of the first silicon-based active material included in the second anode active material layer 124 may be greater than or equal to a content of the second silicon-based active material included in the second anode active material layer 124.

Accordingly, a relatively large amount of the first silicon-based active material may be included in the second anode active material layer 124. Thus, the life-span properties and the room-temperature life-span properties during rapid charging may be improved.

In one embodiment, the first silicon-based active material may not be included in the first anode active material layer 122, and the second silicon-based active material may not be included in the second anode active material layer 124.

As described above, a content ratio of the first silicon-based active material in the first anode active material layer 122 and the second anode active material layer 124 may be adjusted, so that the high-temperature life-span properties may be maintained or improved while also improving the rapid-charging and room-temperature life-span properties.

In some embodiments, a thickness of the first anode active material layer 122 may be 10% to 90% of a total thickness of the anode active material layer 120. Within the above thickness range, the high-temperature life-span properties may be maintained or improved while improving the rapid charging properties.

In one embodiment, the thickness of the first anode active material layer 122 and the thickness of the second anode active material layer 124 may be substantially the same.

A first anode active material composition including the carbon-based active material, the first silicon-based active material and the second silicon-based active material may be coated on the anode current collector 125, and then dried and pressed to form the first anode active material layer 122.

A second anode active material composition including the carbon-based active material, the first silicon-based active material and the second silicon-based active material may be coated on the first anode active material layer 122, and then dried and pressed to form the second anode active material layer 124.

In one example, the first and second anode active material compositions may be prepared by mixing the carbon-based active material, the first silicon-based active material and the second silicon-based active material in the above-described solvent with the anode binder, the conductive material, the thickener and/or the dispersive agent.

Figure 3:
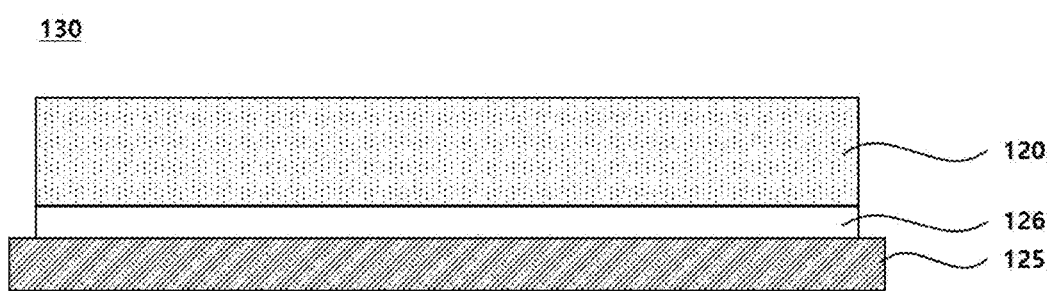
FIG. 3 is a schematic cross-sectional view illustrating an anode for a lithium secondary battery in accordance with further embodiments.

FIG. 3 is a schematic cross-sectional view illustrating an anode for a lithium secondary battery in accordance with other embodiments of the present disclosure.

Referring to FIG. 3, a primer layer 126 including an anode binder may be further disposed between the anode current collector 125 and the anode active material layer 120. Accordingly, a content of the anode binder included in the anode active material layer 120 may be reduced, and a content of the anode active material may be increased. Thus, the capacitive properties of the anode 130 may be further improved.

The anode binder included in the primer layer 126 may include, e.g., styrene-butadiene rubber (SBR), carboxymethyl cellulose (CMC), polyacrylic acid (PAA) or polyvinyl alcohol (PVA). These may be used alone or in combination therefrom.

In some embodiments of the present disclosure, the primer layer 126 may further include the carbon-based active material, carbon nanotube, the first silicon-based active material and/or the second silicon-based active material. In this case, the life-span properties may be further improved.

Figure 4:
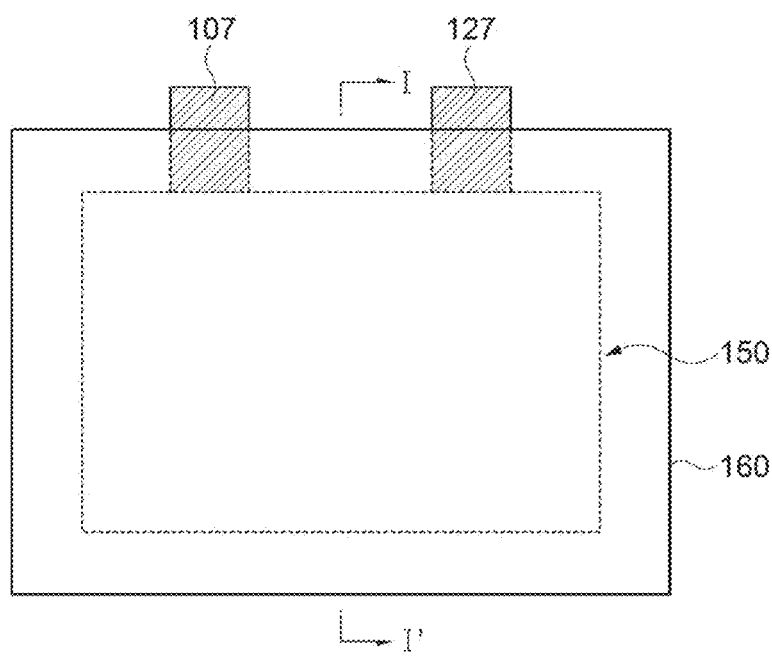
FIGS. 4 and 5 are a schematic plan view and a schematic cross-sectional view, respectively, illustrating a lithium secondary battery in accordance with various embodiments.
Figure 5:
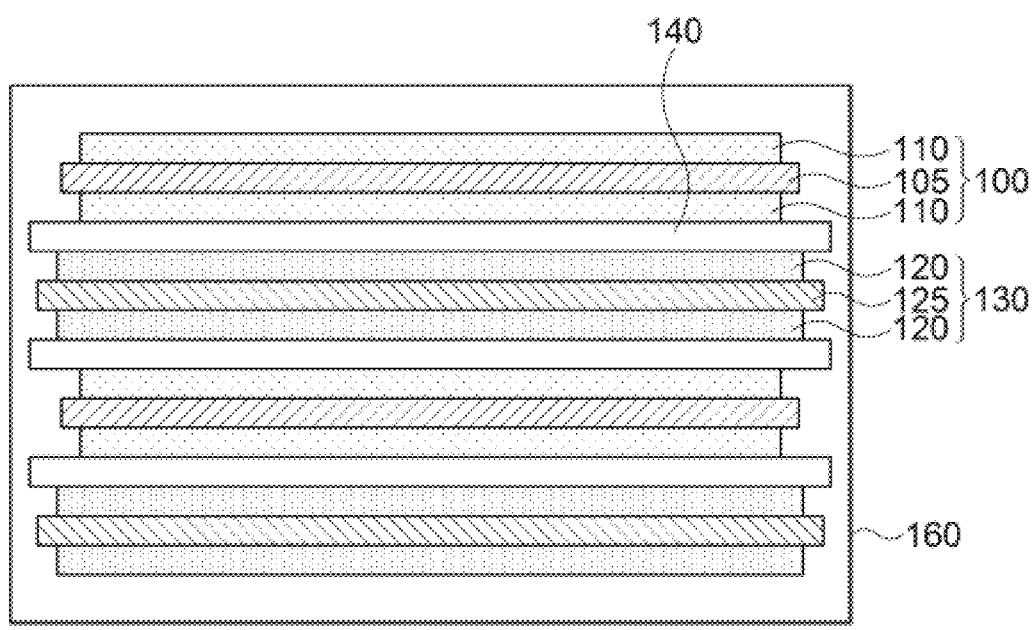

FIGS. 4 and 5 are a schematic plan view and a schematic cross-sectional view, respectively, illustrating a lithium secondary battery in accordance with various embodiments of the present disclosure. FIG. 5 is a cross-sectional view taken along a line I-I' of FIG. 4 in a thickness direction.

Referring to FIGS. 4 and 5, the lithium secondary battery may include an electrode assembly 150 including the above-described anode 130 and the cathode 100 facing the anode 130. The electrode assembly 150 may be accommodated and impregnated with the electrolyte in the case 160.

The cathode 100 may include a cathode active material layer 110 formed by coating a mixture including a cathode active material on at least one surface of the cathode current collector 105.

The cathode current collector 105 may include stainless steel, nickel, aluminum, titanium, or an alloy thereof. The cathode current collector 105 may include aluminum or stainless steel surface-treated with carbon, nickel, titanium or silver.

The cathode active material may include a compound capable of reversibly intercalating and de-intercalating lithium ions.

In various embodiments of the present disclosure, the cathode active material may include a lithium-transition metal oxide. For example, the lithium-transition metal oxide may include nickel (Ni) and may further include at least one of cobalt (Co) and manganese (Mn).

For example, the lithium-transition metal oxide may be represented by Chemical Formula 1 below.

$$Li_xNi_{1-y}M_yO_{2+z}$$ [Chemical Formula 1]

In Chemical Formula 1, 0.9≤x≤1.2, 0≤y≤0.7, and −0.1≤z≤0.1. M may include at least one element selected from Na, Mg, Ca, Y, Ti, Hf, V, Nb, Ta, Cr, Mo, W, Mn, Co, Fe, Cu, Ag, Zn, B, Al, Ga, C, Si, Sn and Zr.

In some embodiments of the present disclosure, a molar ratio or a concentration (1−y) of Ni in Chemical Formula 1 may be greater than or equal to 0.8, and may exceed 0.8 in one embodiment.

A mixture may be prepared by mixing and stirring the cathode active material in a solvent with a cathode binder, a conductive material and/or a dispersive agent. The mixture may be coated on the cathode current collector 105, and then dried and pressed to form the cathode 100.

The solvent may include a non-aqueous solvent. For example, N-methyl-2-pyrrolidone (NMP), dimethylformamide, dimethylacetamide, N,N-dimethylaminopropylamine, ethylene oxide, tetrahydrofuran, etc., may be used.

The cathode binder may include an organic based binder such as a polyvinylidene fluoride-hexafluoropropylene copolymer (PVDF-co-HFP), polyvinylidene fluoride (PVDF), polyacrylonitrile, polymethylmethacrylate, etc., or an aqueous based binder such as styrene-butadiene rubber (SBR) that may be used with a thickener such as carboxymethyl cellulose (CMC).

In one embodiment, a PVDF-based binder may be used as the cathode binder. In this case, an amount of the binder for forming the cathode active material layer may be reduced, and an amount of the cathode active material may be relatively increased. Thus, capacity and power of the lithium secondary battery may be further improved.

The conductive material may include substantially the same compound as the conductive material used in the formation of the anode active material layer 120.

The anode 130 may be formed as described above.

Referring back to FIG. 5, a separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may be also formed from a non-woven fabric including a glass fiber with a high melting point, a polyethylene terephthalate fiber, or the like.

In some embodiments of the present disclosure, an area 130 (e.g., a contact area with the separation layer 140) and/or a volume of the anode may be greater than that of the cathode 100. Thus, lithium ions generated from the cathode 100 may transfer to the anode 130 without significant loss by, e.g., precipitation or sedimentation. Thus, the improvements of capacity and power according to the above-mentioned anode active material may be sufficiently implemented.

In various embodiments of the present disclosure, an electrode cell may be defined by the cathode 100, the anode 130 and the separation layer 140, and a plurality of the electrode cells may be stacked to form an electrode assembly 150 having, e.g., a jelly roll shape. For example, the electrode assembly 150 may be formed by winding, laminating or folding of the separation layer 140.

The electrode assembly 150 may be accommodated together with an electrolyte in a case 160 to define a lithium secondary battery. In some embodiments of the present disclosure, a non-aqueous electrolyte may be used as the electrolyte.

The non-aqueous electrolyte solution may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 4, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Hereinafter, various embodiments are provided to more concretely describe the present disclosure. However, the following examples are only given for illustrating the present disclosure, and those skilled in the related art will recognize that various alterations and modifications are possible within the scope of the present invention.

Example 1

(1) Fabrication of Anode
1) Preparation of First Silicon-Based Active Material

A magnesium-doped first silicon-based active material was prepared by adding and mixing magnesium in an amount corresponding to 8 wt % relative to a total weight of a first silicon-based active material in silicon oxide (SiOx, 0<x<2, D50: 6 μm).

Specifically, silicon and $SiO_2$ were mixed in a molar ratio of 1:1, and 8 wt % of magnesium based on the total weight of the first silicon-based active material was mixed with silicon and $SiO_2$ to form a mixture.

The mixture was calcined at 1500° C. and then cooled to precipitate a silicon oxide composite containing magnesium. The precipitated silicon oxide composite was pulverized and classified to prepare the first silicon-based active material.

2) Formation of Anode Active Material Layer 63.50 wt % of artificial graphite (D50: 20 μm) as a carbon-based active material, 16.00 wt % of the prepared first silicon-based active material, 16.00 wt % of silicon oxide (SiOx, 0<x<2, D50: 5 μm) as a second silicon-based active material, 0.50 wt % of single wall carbon nanotubes (SWCNTs) conductive material, and 4 wt % of CMC/SBR (binder, 1.50/2.50 weight ratio) was added in water to prepare an anode active material composition in the form of a slurry.

The anode active material composition was coated on a surface of a copper current collector (copper foil having a thickness of 8 μm), dried and pressed to form an anode including an anode active material layer.

(2) Fabrication of Lithium Secondary Battery

A slurry was prepared by mixing $Li[Ni_{0.88}Co_{0.1}Mn_{0.02}]O_2$ as a cathode active material, multi-wall carbon nanotubes (MWCNTs) as a conductive material, and polyvinylidene fluoride (PVDF) as a binder in a weight ratio of 98.08:0.72:1.2. The slurry was uniformly coated on an aluminum foil having a thickness of 12 and vacuum dried to prepare a cathode for a secondary battery. About 20 wt % of the MWCNT content included a CNT dispersive agent.

The cathode and the anode prepared as described above were each notched by a predetermined size, and stacked with a separator (polyethylene, thickness: 13 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions.

An electrolyte was injected through the electrolyte injection side, and then the electrolyte injection side was also sealed. Subsequently, the above structure was impregnated for more than 12 hours.

In the preparation of the electrolyte, a 1M $LiPF_6$ solution was prepared using a mixed solvent of EC/EMC (25/75; volume ratio), and 8 wt % of fluoroethylene carbonate (FEC), 0.5 wt % of 1,3-propensultone (PRS) and 1.0 wt % of 1,3-propanesultone (PS) were added to the solution.

Thereafter, a heat press pre-charging was performed for 60 minutes with a current corresponding to one half of full charge (0.5 C). Degassing was performed after a stabilization of 12 hours or more, and then aging for more than 24 hours and a formation charge/discharge were performed (charge condition CC-CV 0.25 C 4.2V 0.05 C CUT-OFF, discharge condition CC 0.25 C 2.5V CUT-OFF).

Thereafter, a standard charge and discharge was performed (charge condition CC-CV 0.33 C 4.2V 0.05 C CUT-OFF, discharge condition CC 0.33 C 2.5V CUT-OFF).

[Evaluation Example 1] Evaluation on Rapid-Charge Life-Span Property, Normal (Room Temperature) Life-Span Property and Normal (High Temperature) Life-Span Property (1) Example 2

A double-layered anode active material layer was prepared.

Specifically, 86.15 wt % of artificial graphite (D50: 20 μm) as a carbon-based active material, 10.00 wt % of silicon oxide (SiOx, 0<x<2, D50: 5 μm), 0.25 wt % of SWCNTs conductive material and 3.60 wt % of CMC/SBR (binder, 1.20/2.40 weight ratio) were added in water to form a first anode active material composition in the form of a slurry.

87.95 wt % of artificial graphite (D50: 20 μm) as a carbon-based active material, 10.00 wt % of the prepared first silicon-based active material, 0.25 wt % of SWCNTs conductive material and 1.80 wt % of CMC/SBR (binder, 1.20/0.60 weight ratio) were added to water to prepare a second anode active material composition in the form of a slurry.

The prepared first anode active material composition and the prepared second anode active material composition were sequentially coated on a surface of a copper current collector (8 μm-thickness copper foil), and then dried and pressed to form a first anode active material layer and a second anode active material composition.

An anode and a lithium secondary battery were manufactured by the same method as that in Example 1, except for the above-mentioned details.

(2) Example 3

An anode and a lithium secondary battery were manufactured by the same method as that in Example 2, except that the same amount of the first silicon-based active material was added instead of silicon oxide when preparing the first anode active material composition, and the same amount of silicon oxide (SiOx, 0<x<2, D50: 5 μm) was added instead of the first silicon-based active material when preparing the second anode active material composition.

(3) Example 4

When preparing the first anode active material composition, the same amount of a mixture of the first silicon-based active material:silicon oxide in a weight ratio of 3:7 was added instead of silicon oxide. When preparing the second anode active material composition, the same amount of a mixture of the first silicon-based active material:silicon oxide in a weight ratio of 7:3 was added instead of the first silicon-based active material.

An anode and a lithium secondary battery were manufactured by the same method as that in Example 2, except for the above-mentioned details.

(4) Example 5

When preparing the first anode active material composition, the same amount of a mixture of the first silicon-based active material:silicon oxide in a weight ratio of 7:3 was added instead of silicon oxide. When preparing the second anode active material composition, the composition of a mixture of the first silicon-based active material:silicon oxide in a weight ratio of 3:7 was added instead of the first silicon-based active material.

An anode and a lithium secondary battery were manufactured by the same method as that in Example 2, except for the above-mentioned details.

(5) Example 6

A primer layer was formed between the anode active material layer and the copper current collector.

Specifically, a primer composition was formed by adding 1.50 wt % of a SBR binder to a remainder of water. The primer composition was coated on a surface of a copper current collector (copper foil having a thickness of 8 μm), dried and pressed to form the primer layer.

An anode and a lithium secondary battery were manufactured by the same method as that in Example 1, except for the above-mentioned details.

(6) Comparative Example 1

An anode and a lithium secondary battery were manufactured by the same method as that in Example 1, except that 32.00 wt % of the second silicon-based active material was solely added instead of the first silicon-based active material and the second silicon-based active material.

(7) Comparative Example 2

An anode and a lithium secondary battery were manufactured by the same method as that in Example 1, except that 32.00 wt % of the first silicon-based active material alone was solely added instead of the first silicon-based active material and the second silicon-based active material.

(8) Comparative Example 3

An anode and a lithium secondary battery were manufactured by the same method as that in Example 1, except that 1.00 wt % of the first silicon-based active material and 31.00 wt % of the second silicon-based active material were added to the anode active material composition.

(9) Comparative Example 4

An anode and a lithium secondary battery were manufactured by the same method as that in Example 1, except that 22.00 wt % of the first silicon-based active material and 10.00 wt % of the second silicon-based active material were added to the anode active material composition.

(10) Comparative Example 5

An anode and a lithium secondary battery were manufactured by the same method as that in Example 2, except that the same amount of silicon oxide (SiOx, 0<x<2, D50: 5 μm) was added instead of the first silicon-based active material when preparing the second anode active material composition.

(11) Evaluation Method

1) Evaluation on Rapid Charge Life-Span Property

The lithium secondary batteries prepared according to Examples 1 to 6 and Comparative Examples 1 to 5 were stepwise charged with current rates (C-rates) of 3.25 C/3.0 C/2.75 C/2.5 C/2.25 C/2.0 C/1.75 C/1.5 C/1.25 C/1.0 C/0.75 C/0.5 C such that a DOD72% state is reached within 35 minutes, and then discharged by 1/3 C. A rapid charging evaluation was performed by repeating the charging and discharging cycle as one cycle. After repeating 300 cycles with an interphase of 10 minutes between the charge and discharge cycles, a rapid-charge capacity retention was measured.

2) Evaluation of Normal (Room Temperature) Life-Span Property (25° C.)

Evaluation of normal life-span properties for the lithium secondary batteries manufactured according to Examples 1 to 6 and Comparative Examples 1 to 5 were performed in a range of DOD94% (SOC 4%-98%) in a chamber maintained at 25° C. Under constant current/constant voltage (CC/CV) conditions, the batteries were charged by 0.3 C to a voltage corresponding to SOC98%, and cut-off at 0.05 C. Subsequently, the batteries were discharged by 0.3 C to a voltage corresponding to SOC4% under constant current (CC) conditions, and a discharge capacity was measured. The above-process was repeated by 500 cycles, and then a discharge capacity retention was measured.

3) Evaluation of Normal (High Temperature) Life-Span Property (−45° C.)

Discharge capacity retentions of the lithium secondary batteries prepared in Examples 1 to 6 and Comparative Examples 1 to 5 were measured in a chamber maintained at 45° C. by the same method as that in the above (11) 2).

Contents of the first silicon-based active material and the second silicon-based active material included in each anode active material layer of Examples 1 to 6 and Comparative Examples 1 to 5 and contents of the first silicon-based active material and the second silicon-based active material based on a total weight of the anode active material layer are shown in Table 1 below.

TABLE 1

| No | anode active material layer | first anode active material 1a (wt %) | second anode active material (wt %) |
|---|---|---|---|
| Example 1 | single layer | 16.00 | 16.00 |
| Example 2 | second anode active material layer | 10.00 | 0 |
| | first anode active material layer | 0 | 10.00 |
| | total anode active material layer | 5.00 | 5.00 |
| Example 3 | second anode active material layer | 0 | 10.00 |
| | first anode active material layer | 10.00 | 0 |
| | total anode active material layer | 5.00 | 5.00 |
| Example 4 | second anode active material layer | 7.00 | 3.00 |
| | first anode active material layer | 3.00 | 7.00 |
| | total anode active material layer | 5.00 | 5.00 |
| Example 5 | second anode active material layer | 3.00 | 7.00 |
| | first anode active material layer | 7.00 | 3.00 |
| | total anode active material layer | 5.00 | 5.00 |
| Example 6 | single layer + primer layer | 16.00 | 16.00 |
| Comparative Example 1 | single layer | 0 | 32.00 |
| Comparative Example 2 | single layer | 32.00 | 0 |
| Comparative Example 3 | single layer | 1.00 | 31.00 |
| Comparative Example 4 | single layer | 22.00 | 10.00 |
| Comparative Example 5 | second anode active material layer | 0 | 10 |
| | first anode active material layer | 0 | 10 |
| | total anode active material layer | 0 | 10 |

The results according to Evaluation Example 1 from the lithium secondary batteries of Examples 1 to 6 and Comparative Examples 1 to 5 are shown in Table 2 below.

The case that the discharge capacity was excessively low and the discharge capacity could not be measured before completing the 500 cycles of charging and discharging was designated as "−".

TABLE 2

| No. | rapid charge capacity retention (300 cycles, %) | normal (room temperature) capacity retention (500 cycles, %) | normal (high temperature) capacity retention (500 cycles, %) |
|---|---|---|---|
| Example 1 | 91.7 | 90.9 | 85.1 |
| Example 2 | 93.3 | 94.1 | 87.5 |
| Example 3 | 90.1 | 94.8 | 91.6 |
| Example 4 | 92.1 | 93.5 | 88.1 |
| Example 5 | 90.5 | 93.9 | 90.7 |
| Example 6 | 92.6 | 91.3 | 84.9 |
| Comparative Example 1 | 71.4 | — | 87.3 |
| Comparative Example 2 | 94.3 | 91.8 | 75.8 |
| Comparative Example 3 | 76.2 | — | 87.0 |
| Comparative Example 4 | 92.7 | 91.2 | 82.8 |
| Comparative Example 5 | 79.5 | 86.7 | 92.1 |

Referring to Table 2, in Examples 1 to 6 including the first silicon-based active material in a predetermined content range, improved rapid charge life-span and normal life-span properties were obtained compared to those from Comparative Examples. In Examples 2 and 4, a relatively large amount of the first silicon-based active material was included in the second anode active material layer, so that improved rapid charge life-span properties were provided.

In Examples 3 and 5, a relatively large amount of the first silicon-based active material was included in the first anode active material layer, so that improved high-temperature life-span properties were provided.

In Example 6, the rapid charge life-span property greater than that of Example 1 was improved by the introduction of the primer layer.

[Evaluation Example 2] Evaluation on Rapid Charge Life-Span Property According to Magnesium Content (1) Example 7

An anode and a lithium secondary battery were manufactured by the same manner as that in Example 1, except that magnesium was added in an amount corresponding to 4 wt % based on a total weight of the silicon-based active material.

(2) Example 8

An anode and a lithium secondary battery were manufactured by the same manner as that in Example 1, except that magnesium was added in an amount corresponding to 18 wt % based on the total weight of the silicon-based active material.

(3) Example 9

An anode and a lithium secondary battery were manufactured by the same manner as that in Example 1, except that magnesium was added in an amount corresponding to 15 wt % based on the total weight of the silicon-based active material.

(4) Evaluation Method

1) Peak Area Ratio of Mg1s Spectrum from Surface of First Silicon-Based Active Material The anode active material layers prepared in Examples 1 and 7 to 9 were measured by an XPS to measure a 1303 eV peak area and a 1304.5 eV peak area shown in a Mg1s spectrum.

The XPS analysis was performed under the following conditions to measure the 1303 eV peak area and the 1304.5 eV peak area.

[XPS Analysis Conditions]
  i) X-ray type: Al k alpha, 1486.68 eV, 900 μm Beam size
  ii) Analyzer: CAE (constant analyzer energy) Mode
  iii) Number of scans: 50
  iv) Pass energy: 20 eV
  v) Dwell Time: 100 ms
  vi) Ion gun: Ar ion
  vii) Ion energy: 4000 eV
  viii) Etch Cycle: 300s
  ix) Total Levels: 20

The peak areas were substituted into Formula 1 and listed in Table 3 below.

2) Evaluation on Power Property

For the lithium secondary batteries prepared in Examples 1 and 7 to 9, charge (CC/CV 0.3 C 4.2V 0.05 C CUT-OFF) and discharge (CC 0.3 C 2.5V CUT-OFF) at room temperature (25° C.) were performed twice. Thereafter, the batteries were discharged (CC 0.3 C) from a charged state (CC/CV 0.3 C 4.2V 0.05 C CUT-OFF) to an S0050% point, and a power (W/kg) of discharging and charging at the S0050% point were measured.

3) Evaluation on Rapid Charge Life-Span Property

In the same method as manner as in (11)1) of Evaluation Example 1, the rapid charge life-span properties of the lithium secondary batteries according to Examples 1 and 7 to 9 after 300 cycles were evaluated.

The magnesium (Mg) content of the anode active material layers of Examples 1 and Examples 7 to 9, the peak area ratio of the Mg1s spectrum, and the rapid charge life-span property are shown in Table 3 below.

TABLE 3

| No. | Mg content (wt %) | peak area ratio of Mg1s spectrum | discharge power (W/kg) | charge power (W/kg) | rapid charge capacity retention (300 cycles, %) |
|---|---|---|---|---|---|
| Example 1 | 8 | 0.22 | 3110.5 | 2517.5 | 90.9 |
| Example 7 | 4 | 0.11 | 3194.2 | 2610.1 | 83.2 |
| Example 8 | 18 | 0.59 | 3007.9 | 2438.4 | 84.7 |
| Example 9 | 15 | 0.64 | 3020.9 | 2450.3 | 88.3 |

Referring to Table 3, in Example 7, the doping content of magnesium was less than 5 wt % based on the total weight of the first silicon-based active material, and the life-span property was relatively lowered compared to those from other Examples.

In Example 8, the doping content of magnesium exceeded 17 wt % based on the total weight of the silicon-based active material, and resistance increased and power properties decreased compared to those from other Examples.

In Example 9, the peak area ratio expressed by Formula 1 exceeded 0.6, and the capacity retention was relatively lowered compared to those from other Examples.

[Evaluation Example 3] Evaluation of Battery Properties According to Silicon-Based Active Material Content (1) Examples 10 to 14

An anode and a lithium secondary battery were manufactured by the same method as that in Example 1, except that a sum of the content of the first silicon-based active material and the content of the second silicon-based active material based on the total weight of the anode active material layer was adjusted as shown in Table 4 below.

The first silicon-based active material and the second silicon-based active material were added in a weight ratio of 1:1 for each anode active material layer.

(2) Evaluation Method

1) Evaluation on Volume Expansion Ratio

After being charged (CC/CV 0.1 C 0.01V (vs. Li) 0.01 C CUT-OFF) at room temperature (25° C.), the lithium secondary batteries prepared in Examples 1 and Examples 10 to 14 were disassembled.

A thickness (SOC0%, t1) of the non-charged anode and a thickness (SOC100%, t2) of the charged anode were measured, and an expansion ratio of the anode was calculated through Equation 2 below.

Expansion ratio (%)=(t2−t1)/(t1−current collector thickness)×100  [Equation 2]

In Equation 2, the current collector thickness is a thickness of the anode current collector used in manufacturing the anode of the secondary battery.

2) Evaluation on Rapid Charge Life-Span Property

The rapid charge life-span properties of the lithium secondary batteries according to Examples 1 and 10 to 14 after 300 cycles were evaluated by the same method as that in Evaluation Example 1.

The results are shown in Table 4 below.

TABLE 4

| No. | content of silicon-based active material (wt %) | volume expansion ratio (%) | rapid charge capacity retention (300 cycles, %) |
|---|---|---|---|
| Example 1 | 32.0 | 47.6 | 91.7 |
| Example 10 | 6.0 | 27.6 | 84.4 |
| Example 11 | 25.0 | 42.3 | 93.3 |
| Example 12 | 38.0 | 52.3 | 88.7 |
| Example 13 | 42.0 | 57.3 | 81.2 |
| Example 14 | 0.05 | 23.0 | 78.3 |

Referring to Table 4, in Examples 1 and Examples 10 to 12, the volume expansion ratio was reduced and the rapid charge life-span property was enhanced.

In Example 13, the sum of the contents of the first silicon-based active material and the second silicon-based active material exceeded 40 wt %, resulting in relatively increased volume expansion ratio.

In Example 14, the content of the silicon-based active material was less than 0.1 wt % and the rapid charge life-span property was relatively degraded.

Evaluation Example 4: Evaluation on Life-Span Properties According to Content of Natural Graphite and Artificial Graphite (1) Examples 15 and 16

An anode and a lithium secondary battery were manufactured by the same method as that in Example 1, except that the contents of artificial graphite and the content of natural graphite based on the total weight of the anode active material layer were adjusted as shown in Table 5 below.

(2) Evaluation Method

The rapid charge capacity retention, the normal (room temperature) charge capacity retention and the normal (high temperature) charge capacity retention were measured by the same method as those in Evaluation Example 1.

TABLE 5

| No. | content of artificial graphite (wt %) | content of natural graphite (wt %) | content of silicon-based active material (wt %) |
|---|---|---|---|
| Example 1 | 63.5 | — | 32 |
| Example 15 | — | 63.5 | 32 |
| Example 16 | 43.5 | 20 | 32 |

TABLE 6

| No. | rapid charge capacity retention (300 cycles, %) | normal (room temperature) charge capacity retention (500 cycles, %) | normal (high temperature) charge capacity retention (500 cycles, %) |
|---|---|---|---|
| Example 1 | 91.7 | 90.9 | 85.1 |
| Example 15 | — | — | 81.7 |
| Example 16 | 81.4 | 83.2 | 84.3 |

Referring to Tables 5 and 6, in Example 15 where natural graphite was used instead of artificial graphite, the capacity retention r was lowered compared to those from Example 1 and Example 16 where the content of natural graphite was relatively lower than that of artificial graphite.

What is claimed is:

1. An anode for a lithium secondary battery, comprising:
   an anode current collector;
   a first anode active material layer disposed on at least one surface of the anode current collector; and
   a second anode active material layer disposed on the first anode active material layer,
   wherein each of the first anode active material layer and the second anode active material layer comprises a first silicon-based active material doped with magnesium and a second silicon-based active material not doped with magnesium,
   a content of the first silicon-based active material included in the first anode active material layer is greater than or equal to a content of the second silicon-based active material included in the first anode active material layer, and
   a content of the first silicon-based active material included in the second anode active material layer is less than or equal to a content of the second silicon-based active material included in the second anode active material layer.

2. The anode for a lithium secondary battery according to claim 1, wherein the second silicon-based active material is doped with at least one metal selected from the group consisting of Li, Al, Ca, Fe, Ti and V.

3. The anode for a lithium secondary battery according to claim 1, wherein a sum of contents of the first silicon-based active material and the second silicon-based active material not doped with magnesium is in a range from 6 wt % to 25 wt % based on the total weight of the first anode active material layer and the second anode active material layer.

4. The anode for a lithium secondary battery according to claim 1, wherein at least one of the first silicon-based active material and the second silicon-based active material comprises a carbon coating layer disposed on an outermost portion thereof.

5. The anode for a lithium secondary battery according to claim 1, wherein at least one of the first anode active material layer and the second anode active material layer includes a carbon-based active material comprising artificial graphite.

6. The anode for a lithium secondary battery according to claim 5, wherein the carbon-based active material further comprises natural graphite, and
   a total content of natural graphite included in the first anode active material layer and the second anode active material layer is less than or equal to a total content of artificial graphite included in the first anode active material layer and the second anode active material layer.

7. The anode for a lithium secondary battery according to claim 1, wherein a content of magnesium doped in the first silicon-based active material is in a range from 5 wt % to 17 wt % based on a total weight of the first silicon-based active material.

8. The anode for a lithium secondary battery according to claim 1, wherein a Mg1s spectrum of a surface of the first silicon-based active material measured by an X-ray photoelectron spectroscopy satisfies Formula 1:

$$P_{Mg}/(P_{Mg}+P_{MgO}) \leq 0.6 \quad \text{[Formula 1]}$$

wherein, in Formula 1, $P_{Mg}$ is an area of a 1303 eV peak of the Mg1s spectrum, and $P_{MgO}$ is an area of a 1304.5 eV peak of the Mg1s spectrum.

9. The anode for a lithium secondary battery according to claim 1, wherein a content of the first silicon-based active material is in a range from 2 wt % to 20 wt % based on the total weight of the first anode active material layer and the second anode active material layer.

10. The anode for a lithium secondary battery according to claim 1, further comprising a primer layer disposed between the anode current collector and the first anode active material layer, the primer layer comprising an anode binder.

11. The anode for a lithium secondary battery according to claim 10, wherein the anode binder includes at least one selected from the group consisting of styrene-butadiene rubber (SBR), carboxymethyl cellulose (CMC), polyacrylic acid (PAA) and polyvinyl alcohol (PVA).

12. The anode for a lithium secondary battery according to claim 10, wherein the primer layer further comprises at least one selected from the group consisting of a carbon-based active material comprising artificial graphite, the first silicon-based active material, and the second silicon-based active material.

13. A lithium secondary battery, comprising:
the anode for a lithium secondary battery of claim 1; and
a cathode facing the anode.

14. An anode for a lithium secondary battery, comprising:
an anode current collector;
a first anode active material layer disposed on at least one surface of the anode current collector; and
a second anode active material layer disposed on the first anode active material layer,
wherein each of the first anode active material layer and the second anode active material layer comprises a first silicon-based active material doped with magnesium and a second silicon-based active material not doped with magnesium,
a content of the first silicon-based active material included in the first anode active material layer is less than or equal to a content of the second silicon-based active material included in the first anode active material layer, and
a content of the first silicon-based active material included in the second anode active material layer is greater than or equal to a content of the second silicon-based active material included in the second anode active material layer.

* * * * *